United States Patent Office 2,872,427
Patented Feb. 3, 1959

2,872,427

POLYEPOXIDE EMULSIONS AND METHOD OF TREATING TEXTILES THEREWITH

Carl W. Schroeder, Orinda, Calif., assignor to Shell Development Company, New York, N. Y., a corporation of Delaware No Drawing. Application October 4, 1954
Serial No. 460,272

20 Claims. (Cl. 260—29.2)

This invention relates to aqueous emulsions and their preparation. More particularly, the invention relates to oil-in-water emulsions wherein the dispersed phase is a polyepoxide, and to the use of these emulsions as dressing and finishing compositions and in the preparation of surface coatings.

Specifically, the invention provides new and particularly useful stable oil-in-water emulsions wherein the dispersed phase is a polyepoxide, and preferably a glycidyl polyether of a polyhydric phenol, and the dispersing phase is an aqueous medium containing an acid and alkali-stable non-ionic emulsifying agent and a water-dispersible binding colloid. The invention further provides a method for using the above-described oil-in-water emulsions in the treatment of various materials, such as textiles, paper, leather, glass, metals and the like, and in the preparation of surface coatings.

As a special embodiment, the invention provides oil-in-water emulsions as described above containing an epoxy curing agent comprising an acid anhydride and a process for using these special compositions in the treatment of fabrics to give them a permanent starch finish.

Polyepoxides, such as the commercially available glycidyl polyethers of polyhydric phenols, may be easily cured with agents such as acids, amines and the like, to form hard castings and it occurred to me that they would be very good materials for use in the treatment of materials, such as textiles, paper, and leather, and in the preparation of surface coatings as paints and enamels. Experience has shown, however, that these polyepoxides are not satisfactory for use in treating textiles and paper as they are very difficult to put into a solution which could be applied to the textiles and paper and still give the desired improvement in properties as shrink resistance and wet strength. These polyepoxides may, for example, be applied in the form of a solvent solution but the resulting products fail to have the desired properties. Emulsions prepared from the conventional ionic emulsifying agents are unsuited as they are unstable, difficult to cure and give non-uniform cured products which fail to have the desired improved properties.

The polyepoxides have also found little use in the preparation of surface coatings because of the problems involved in their solution. Solvent solutions of the polyepoxides, for example, are in many cases dangerous to employ and are objectionable because of the odor of the solvent. Emulsions of the polyepoxides prepared from ionic emulsifying agents are unsatisfactory as coatings as they are unstable and the presence of the emulsifier tends to interfere with the function of the curing agent with the result that the films do not have the proper rate of cure.

It is an object of the invention to provide a class of aqueous emulsions. It is a further object to provide new stable oil-in-water emulsions wherein the dispersed phase is a polyepoxide and a method for their preparation. It is a further object to provide new stable aqueous emulsions of polyepoxides which are particularly useful as dressing and finishing compositions for materials, such as textiles, paper, leather, and the like. It is a further object to provide aqueous emulsions of polyepoxides containing epoxy curing agents that can be easily applied to textile fabrics to give them improved crease and shrink resistance. It is a further object to provide stable aqueous emulsions of polyepoxides that may be used to give permanent starch finishes to textiles. It is a further object to provide stable aqueous emulsions that can be applied to paper to improve its wet strength. It is a further object to provide aqueous emulsions of polyepoxides which are useful in the preparation of surface coatings. It is a further object to provide aqueous polyepoxide emulsions that may be used in preparing improved paints and enamels. Other objects and advantages of the invention will be apparent from the following detailed description thereof.

It has now been discovered that these and other objects may be accomplished in part by the novel aqueous emulsions of the present invention which comprise oil-in-water emulsions wherein the dispersed phase is a polyepoxide, and preferably a glycidyl polyether of a polyhydric phenol, and the dispersing phase is an aqueous medium containing an acid and alkali-table non-ionic emulsifying agent and a water-dispersible binding colloid, such as, for example, polyvinyl alcohol, copolymers of styrene and fumaric acids, and the like. It has been found that these particular oil-in-water emulsions have surprising stability and can be stored for many months without deteriorating. In addition, these emulsions may be easily applied in a uniform manner to various surfaces, such as textile and paper surfaces, and cured in the presence of epoxy curing agents to form products having the desired improvement in properties, such as shrink resistance, crease resistance and wet strength.

It has also been found that the above-described stable oil-in-water emulsions containing epoxy curing agents comprising acid anhydrides may be applied to textile fabrics and cured therein to form starch finishes which are resistant to washing and dry cleaning. Such emulsions are ideally suited for treatment of fabrics used in preparing shirts, linen, draperies and the like.

It has been further found that the above-described stable emulsions may be used in the preparation of surface coatings, such as paints and enamels, which are particularly suited for use in the coating of metals, glass, wood, plaster, and the like.

The polyepoxides to be used in preparing the aqueous emulsions of the present invention comprise the organic materials having at least two epoxy groups, i. e.

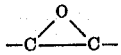

groups per molecule. The polyepoxides may be saturated or unsaturated, aliphatic, cycloaliphatic, aromatic or heterocyclic and may be substituted if desired with other substituents, such as hydroxyl groups, halogen atoms, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U. S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like.

Examples of the polyepoxides include, among others, epoxidized triglycerides as epoxidized glycerol trioleate and epoxidized glycerol trilinoleate, the diacetate of epoxidized glycerol dioleate, 1,4-bis(2,3-epoxypropoxy) benzene, 1,3 - bis(2,3 - epoxypropoxy)benzene 4,4' - bis-(2,3-epoxypropoxy)diphenyl ether, 1,8-bis(2,3-epoxypropoxy)-octane, 1,4-bis(2,3-epoxypropoxy)cyclohexane, 4,4' - bis(2-hydroxy - 3,4' - epoxybutoxy)diphenyldimethylmethane, 1,3-bis(4,5-epoxypentoxy) - 5 - chlorobenzene, 1,4 - bis(3,4-epoxybutoxy) - 2 - chlorocyclohexane, 1,3-bis (2-hydroxy-3,4-epoxybutoxy)benzene, 1,4-bis and (2-hydroxy-4,5-epoxypentoxy)benzene.

Other examples include the epoxy polyethers of polyhydric phenols obtained by reacting a polyhydric phenol with a halogen containing epoxide in the presence of an alkaline medium. Thus, polyether A described hereinafter, which is substantially 2,2-bis(2,3-epoxypropoxyphenyl)propane is obtained by reacting bis-phenol, i. e. (2,2-bis(4-hydroxyphenyl)propane), with an excess of epichlorohydrin as indicated below. Other polyhydric phenols that can be used for this purpose include resorcinol, catechol, hydroquinone, methyl resorcinol, or polynuclear phenols, such as 2,2-bis(4-hydroxyphenol)-butane, 4,4'-dihydroxybenzophenone, bis(4-hydroxyphenyl)ethane, 2,2 - bis(4 - hydroxphenyl)pentane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane, and the like.

Preferred polyepoxides of this type are the glycidyl polyethers of dihydric phenols obtained by reacting epichlorohydrin with a dihydric phenol in an alkaline medium. The monomer products of this type may be represented by the general formula

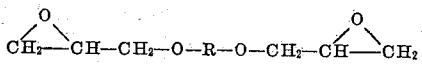

wherein R represents a divalent hydrocarbon radical of the dihydric phenol. The polymeric products will generally not be a single simple molecule but will be a complex mixture of glycidyl polyethers of the general formula

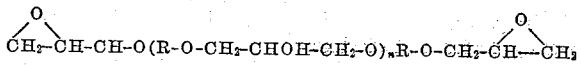

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyether will be illustrated below. Unless otherwise specified, parts indicated are parts by weight.

PREPARATION OF GLYCIDYL POLYETHERS OF DIHYDRIC PHENOLS

*Polyether A.*—About 2 moles of bis-phenol was dissolved is 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as polyether A.

*Polyether B.*—A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating a final temperature of 140° C. in 80 minutes, and cooled rapidly. At room temperature, the product was an extremely viscous semi-solid having a melting point of 27° C. by Durran's mercury method and a molecular weight of 483. The product had an epoxy value eq./100 g. of 0.40 so the epoxy equivalency was 1.9. For convenience, this product will be referred to as polyether B.

*Polyether C.*—About 228 parts of bis-phenol and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at a temperature of 130° C. The Durran's mercury method melting point of the resulting product is 52° C. and the molecular weight is about 710. The product has an epoxy value of 0.27 eq./100 g. so the epoxy equivalency is 1.9.

*Polyether D.*—By using a smaller ratio of epichlorohydrin to bis-phenol, a glycidyl polyether of higher melting point was obtained. Thus, polyether D was obtained in the same manner as polyether C except that for every mole of bis-phenol, there was used 1.57 moles of epichlorohydrin and 1.88 moles of sodium hydroxide. This provided a product having a melting point of about 70° C., a molecular weight of 900 and an epoxide value of 0.20 eq./100 g.

*Polyether E.*—This glycidyl polyether of still higher melting point was prepared in like manner to that of polyether B except that for each mole of bis-phenol there was employed 1.22 moles of epichlorohydrin and 1.37 moles of sodium hydroxide. The resulting product had a melting point of 98° C., a molecular weight of 1400 and an epoxide value of 0.103 eq./100 g.

Glycidyl polyethers of higher molecular weight and softening point are best prepared by reacting a lower polyether with less than an equimolecular amount of dihydric phenol. Thus, upon heating the above-noted product which has a softening point of 98° C. to a temperature of about 150° C. and then adding 5% by weight of bis-phenol after which the temperature is gradually increased to 190° C. in about 30 minutes followed by maintaining the temperature at this point for an additional 1½ hours, there is obtained a glycidyl polyether having a softening point of 131° C., an epoxy value of 0.05 equivalent of epoxy per 100 grams and a molecular weight of 2900.

Preferred members of the above-described group of polyepoxides are the glycidyl polyethers of the dihydric phenols, and especially 2,2-bis-(4-hydroxyphenyl)propane, having an epoxy equivalency between 1.0 and 2.0 and a molecular weight between 300 and 900. Particularly preferred are those having a Durran's mercury method softening point no greater than 60° C.

The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

Another group of polyepoxides that may be used in preparing the emulsions comprise the glycidyl ethers of novalac resins which resins as obtained by condensing an aldehyde with a polyhydric phenol. A typical member of this class is the epoxy resin from formaldehyde 2,2-bis(4-hydroxyphenol)propane novalac resin which contains as predominant constituent the substance represented by the formula

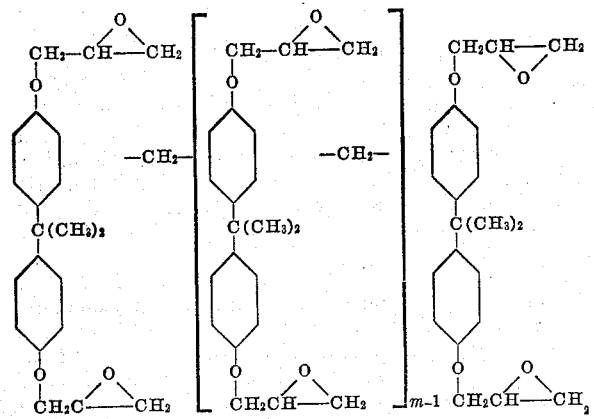

wherein $m$ is a value of at least 1.0. For the nature and preparation of novalac resins, see the book by T. S. Carswell, Phenoplasts, 1947, page 29, et seq.

Another group of polyepoxides includes the glycidyl polyethers of a polyhydric phenol which has two hydroxyaryl groups separated by an aliphatic chain of at least six carbon atoms in the chain and with the chain being attached by carbon-to-carbon bonding to a nuclear carbon atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain. Mixed grades of Cardanol containing about equal amounts of $m$-(8-pentadecenyl)phenol and a phenol with a 15 carbon atom side chain having two double bonds similarly removed from the aromatic nucleus are available from the Irvington Varnish and Insulator Co.

The preparation of a glycidyl ether of a polyhydric phenol having the above-described structure is illustrated below.

*Polyether F.*—A mixture of 250 parts of phenol and 20 parts of $BF_3$-ether complex containing about 48% $BF_3$ was heated at 55–60° C. while adding 150 parts of the above-noted mixed grade of Cardanol obtained from Irvington Varnish and Insulator Co., over a period of one hour. The reaction mixture was stirred rapidly during the addition and for about 75 minutes thereafter. The reaction was stopped by addition of 30 parts of concentrated ammonium hydroxide solution.

The cured reaction product was washed four times with 100 parts portions of water at 85–95° C. and was then subjected to distillation. Unreacted phenol was removed by co-distillation with water, additional water being added to the distillation vessel from time to time. The distillation was continued until the distillate was essentialy free of phenol as detected by formation of blue color with ferric chloride.

One hundred parts of the polyhydric phenol was dissolved in 260 parts of epichlorohydrin and 1 part of water was added. The solution was heated to reflux and 25 parts of pellets of sodium hydroxide was added in 5 parts portions at intervals of 15 minutes. The reaction mixture was held at reflux for an additional hour and then the epichlorohydrin and water were distilled off. The product was then dissolved in about 175 parts of toluene and salt removed by filtration. The toluene was removed by distillation to a temperature of 110° C. at 35 mm. pressure, the product was a viscous liquid which analyzed as follows:

| | |
|---|---|
| Molecular weight | 603 |
| Epoxide equivalents per 100 gms | 0.306 |
| Epoxide equivalent per mol | 1.84 |
| Hydroxyl equivalent per 100 gms | 0.023 |
| Chlorine, percent | 0.37 |

Examples of the polymeric-type polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

Other polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomer, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chlorallyl acetate, and vinyl methallyl pimelate. Illustrative examples of these polymers include poly(allyl 2,3-epoxy-propyl ether), poly(2,3-epoxypropyl crotonate), allyl 2,3-epoxypropyl ether-styrene copolymer, methallyl 3,4-epoxybutyl etherallyl benzoate copolymer, poly(vinyl 2,3-epoxypropyl ether), allyl glycidyl ether-vinyl acetate copolymer and poly(4-glycidyloxystyrene).

Another group of polyepoxides include the epoxy esters of polybasic acids, such as diglycidyl phthalate and diglycidyl adipate, diglycidyl tetrahydrophthalate, diglycidyl maleate, and the like.

These polymers are preferably prepared by heating the monomer or monomers in bulk or in the presence of an inert solvent such as benzene in the presence of air or a peroxy catalyst, such as ditertiary-butyl peroxide, at temperatures ranging from 75° C. to 200° C.

The preparation of polymers of this type may be illustrated by the following example showing the preparation of poly(allyl glycidyl ether).

*Polyether G.*—About 100 parts of allyl glycidyl ether was combined with an equal amount of benzene and the resulting mixture heated at 155° C. in the presence of 3% ditertiary-butyl peroxide. The solvent and unreacted monomer were then removed by distillation. The poly(allyl glycidyl ether) obtained as the resulting product had a molecular weight of about 481–542 and an epoxy value of 0.50 eq./100 g. For convenience, this product will be referred to hereinafter as polyether G.

Particularly preferred members of the above-described group comprise the polymers of the 2-alkenyl glycidyl ethers having a molecular weight between 300 and 1000 and an epoxy equivalency greater than 1.0 and preferably between 1.2 and 6.0.

Other polyepoxides include the polyepoxy polyethers comprising ethers of epoxy alcohols and polyhydric alcohols such as obtained by reacting, preferably in the presence of an acid-acting compound as hydrofluoric acid, polyhydric alcohols with epichlorohydrin or dichlorohydrins and then dehydrochlorinating the resulting product in the presence of an alkaline component. Examples of polyhydric alcohols that may be used for this purpose include, among others, 1,2,6-hexanetriol, 1,5-pentanediol, butylene glycol, glycerol, sorbitol, mannitol, pentaerythritol, polyallyl alcohol, polyvinyl alcohol, trimethylolpropane, bis(4-hydroxycyclohexyl) dimethylmethane, 1,4-dimethylolbenzene, and the like; polyhydric ether alcohols as triglycerol and dipentaerythritol; polyhydric thioethers, such as 2,2'-dihydroxydiethyl sulfide and 2,2'-3,3'-tetrahydroxy dipropyl sulfide; mercapto alcohols as alpha-monothioglycerol, alpha,alpha'-dithioglycerol; polyhydric alcohol partial esters such as monostearin, pentaerythritol monoacetate and the like; and halogenated polyhydric alcohols as the monochloride of pentaerythritol, monochloride of sorbitol, monochloride of glycerol, and the like.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

The preparation of polyepoxides of this type may be illustrated by the following example showing the preparation of a polyglycidyl ether of 1,2,6-hexanetriol.

*Polyether H.*—An equivalent of 1,2,6-hexanetriol was placed in a reaction kettle and heated to 65° C.–70° C. Sufficient $BF_3$-ethyl ether complex was added to bring the pH to about 1.0 and then 1 equivalent of epichlorohydrin added dropwise. After all the epi had been added, the reaction was continued for about 15 minutes to assure complete reaction. This product was then dissolved in acetone and sodium orthosilicate was added at about 65° C. over a period of 0.5 hour and then filtered to remove the salt. The solvent and light ends were then removed by stripping at a low vacuum. The resulting product had a molecular weight of 325 and an epoxy value of .600 eq./100 g.

Of special interest are the polyepoxides which are substantially water-insoluble and preferably have a water solubility varying from no solubility up to about 30 parts per 100 parts of water at room temperature.

The most efficient results are generally obtained with the polyepoxides containing only carbon, hydrogen and oxygen and, if desired additional elements, such as chlorine.

The amount of the polyepoxide used in the preparation of the aqueous emulsions of the present invention will vary depending upon the intended application. In general, the polyepoxide will vary from .1% to 60% by weight of the water, and more preferably from 1% to 20% by weight of water. If the emulsion is to be used in the treatment of fabrics or papers, the amount of the polyepoxide to be used in preparing the emulsion will depend on the amount of the polyepoxide to be deposited on the fabric and thus in turn will depend upon the number of applications and the pick-up allowed per application. As indicated hereinafter, the amount of the material to be applied to the fabric or paper will generally vary from about 3% to 20%. If a 100% pick-up is allowed and the solution is applied but once, the aqueous emulsion should contain the polyepoxide in amounts varying from 3% to 20% in order to apply the same percentages to the cloth. On the other hand, if say only a 50% pick-up is allowed and the solution applied but once, the impregnating emulsion should contain the material in amounts varying from 6% to 40% in order to apply the material in the preferred amounts of 3% and 20%. In general application, the emulsion is usually applied but once with pick-ups varying from 55% to 100%.

The emulsifying agent employed in preparing the novel emulsions of the present invention must be an acid and alkali stable non-ionic emulsifying agent. The expression "acid and alkali stable" means that the aqueous emulsions prepared from such agents must be stable, i. e., must not coagulate or settle out, when contacted with acids, such as 5% hydrogen chloride or bases such as 5% sodium hydroxide. The expression "non-ionic" refers to those compounds which are not salts and subject to ionization when dissolved in water. Examples of these agents include, among others, partial esters of polyhydric alcohols and saturated or unsaturated fatty acids and preferably fatty acids containing at least 6 and more preferably from 12 to 18 carbon atoms. These esters preferably have less than a majority of the hydroxyl groups of the polyhydric alcohol esterified or acylated. These include particularly the fatty acid esters of inner ethers of hexitol, especially those monoesters of saturated or unsaturated fatty acids of 12 to 18 carbon atoms and hexitans and hexitides such as sorbitan or mannitan monolaurate, monopalmitate, monostearate, monooleates, or the monesters of coconut oil fatty acids and like products described in U. S. 2,322,820. Other examples of partial esters of this type include the pentaerythritol mono- and di-palmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurate, polyglycerol dilaurate, inositol monolaurate, glucose monostearate, sucrose monooleate, polyglycol monooleate, polyglycol monostearate, and the like.

Examples of other suitable non-ionic emulsifying agents include the hydroxypolyoxyalkylene ethers of the above-described partial esters. Preferred members of this group include the polyalkylene glycol ethers of partial esters such as are prepared by reacting an olefin oxide like ethylene oxide with the fatty acid esters of the inner ethers of hexitol in the manner described in U. S. 2,380,166. Specific emulsifiers of this class include, among others, the polyethylene glycol ethers of sorbitan or mannitan monolaurate, monopalmitate, monooleate or monostearate. Other examples of this type include, the polyethylene glycol ethers or pentaerythritol mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, polyglycerol dilaurate, inositol monolaurate, glucose monostearate and the like.

Examples of other suitable non-ionic emulsifying agents include the di- and monoethers of polyhydric compound and particularly the polyalkylene glycols. Especially preferred are the aryl and alkaryl polyethylene glycol ethers such as phenyl polyethylene glycol monoether, xylyl polyethylene glycol monoether, isopropylphenyl polyethylene glycol monoether and the like.

The amount of the emulsifying agent employed in the preparation of the stable emulsions of the invention will vary over a considerable range depending upon the polyepoxide selected and the type of emulsifying agent. In general, the amount of the emulsifying agent will vary from about 1% to 100% by weight of the polyepoxide, and more preferably from 3% to 40% by weight of the polyepoxide. The above-described partial fatty acid esters of polyhydric alcohols and their partial ethers are preferably employed in amounts varying from about 3% to 30% by weight of the polyepoxide.

Any water-dispersible binding colloid may be used in the process. Those preferred in the preparation of the emulsions of the present invention include the polyvinyl alcohols, homopolymers and copolymers of unsaturated acids, such as methacrylic acid, maleic acid and fumaric acid with other unsaturated monomers, such as styrene, alpha-methylstyrene, acrylonitrile, vinyl acetate, vinyl chloride, methyl methacrylate, vinylidene chloride, and the like, polymers of vinyl esters which have been partially deacylated so as to render them water-dispersible, such as partially deacylated polyvinyl acetate, polyvinyl butyrate, polyvinylbenzene, and the like, and salts of such polymers and copolymers. Examples of other suitable binding colloids include methylcellulose carboxymethylcellulose, starch, gelatine, starch degradation products such as dextrine, and the like, and mixtures thereof.

Preferred water-dispersible binding colloids to be used include the polyvinyl alcohols such as those obtained by partial hydrolysis of polyvinyl acetate, carboxymethyl cellulose, methyl cellulose and copolymers of maleic acid.

Particularly preferred are the polyvinyl alcohols obtained by partial hydrolysis of polyvinyl acetate. The available products of this type generally have low, medium or high viscosities and have a degree of hydrolysis varying from about 45% to 99%. Of special interest are the polyvinyl alcohols having high viscosity and a degree of hydrolysis of at least 75%.

The water-dispersible binding colloid should be employed in the emulsion in amounts varying from about .1% to 15% by weight of the polyepoxides. Preferably the binding colloid is utilized in amounts varying from 3% to 10% by weight of the polyepoxide.

The emulsion is prepared by mixing the polyepoxide with the emulsifying agent, adding the water-dispersible binding colloid and then adding warm or hot water with slow stirring until the emulsion inverts. Following the inversion, warm to hot water can be added as rapidly as desired to bring the emulsion up to the desired solution. In some cases, the polyepoxide will be in solid form and it may be necessary to melt the material at temperatures below about 100° C. before it can be mixed with the emulsifying agent.

The aqueous emulsions prepared by the above process have unexpected stability and can be stored for many months without deteriorating. They may be applied to various surfaces, such as textiles, paper, cloth, glass, leather, cellulose and the like, and cured in the presence of epoxy curing agents to give improved properties as shrink resistance, crease resistance, abrasion resistance and improved wet strength.

The aqueous emulsion may also be used in the preparation of surface coatings as paints and enamels. In this application they may be used as such or may be combined with various pigments, dyes, stabilizers, and the like and with other film-forming materials, such as urea-formaldehyde resins, phenol-formaldehyde resins, polyamines, polyamides, polyurethanes, and the like.

If curing agents are to be employed with the emulsions, the agents may be added during or after the preparation of the emulsion. If applied afterwards the curing agents may be sprayed or brushed onto the surfaces already coated with the emulsion. If relatively water-insoluble, the curing agents are preferably added before or during preparation of the emulsion.

Curing agents that may be employed include acid-acting curing agents as well as alkaline-acting agents. Examples of the acid-acting agents include the organic and inorganic acids and anhydrides as citric acid, acetic acid, acetic acid anhydride, butyric acid, caproic acid, phthalic acid, phthalic acid anhydride, tartaric acid, aconitic acid, oxalic acid, succinic acid, succinic acid anhydride, lactic acid, maleic acid, maleic acid anhydride, fumaric acid, glutaconic acid, 1,2,4-butanetricarboxylic acid, isophthalic acid, terephthalic acid, malonic acid, 1,1,5-pentanetricarboxylic acid, acetoacetic acid, naphthalic acid, trimellitic acid, phosphoric acid, boric acid, sulfonic and phosphonic acids, perchloric acid, persulfuric acid, boron-trifluoride complexes, such as for example, boron-trifluoride-amine, boron-trifluoride-amide and boron trifluoride-phenol complexes; primary, secondary and tertiary amines such as ethylene diamine, diethylene triamine, triethylene tetramine, dicyandiamide, melamine, pyridine, cyclohexylamine, benzyldimethylamine, benzylamine, diethylaniline, triethanolamine, benzyldimethylamine, benzylamine, diethylaniline, triethanolamine, piperidine, tetramethyl piperazine, N,N-dibutyl-1,3-propane diamine, N,N-diethyl-1,3-propane diamine, 1,2-diamino-2-methylpropane, 2,7-diamino-2,6-dimethyloctane, dibutylamine, dioctylamine, dinonylamine, distearylamine, diallylamine, o-tolylnaphthylamine, pyrrolidine, 2-methylpyrrolidine, tetrahydropyridine, 2-methylpiperidine, diaminopyridine, tetraethylpentamine, meta-phenylene diamine, and the like and salts of these amines. Salt of inorganic acids, such as zinc fluorborate, magnesium fluoborate, magnesium perchlorate, potassium persulfate, copper fluoborate, copper persulfate, cobaltic fluoborate, chromic nitrate, magnesium nitrate, calcium phosphite, and the like, may also be used.

Preferred curing agents to be employed are the polycarboxylic acids and their anhydrides, primary, secondary and tertiary aliphatic and aromatic amines and the salts of metals of groups I to IV and VIII of the Periodic Table of Elements and inorganic acids the anion portion of which contains at least two dissimilar elements having an atomic weight above 2, and particularly inorganic acids of the formula $$H_a[(X)_w(Z)_y]$$

wherein X is a non-metal having an atomic weight above 2, Z is an element which tends to gain from 1 to 2 electrons in its outer orbit, such as oxygen and fluorine, $w$ is an integer, $y$ is an integer greater than 1 and $a$ equals the valency of the radical $(X)_w(Z)_y$, such as sulfuric acid, fluoboric acid, fluosilicic acid, persulfuric acid, phosphoric acid and the like.

The acids, salts and amine curing agents as described above are particularly useful when using the aqueous emulsions in the treatment of synthetic fibers, such as glass fibers and the like as described hereinafter. When these agents are used with emulsions having higher concentrations of the polyepoxides, they give permanent starch finishes, and at the lower concentrations improve the dyeability and prevent "pilling," i. e., mashing together of the synthetic fibers.

Coming under special consideration as curing agents, particularly when emulsions are used in the treatment of textile fabrics and particularly cellulose fabrics are the acid anhydrides. As indicated above, when these special agents are employed as curing agents, the emulsion of the polyepoxides event in low concentrations impart starch finishes to the textile fabrics. These starch finishes differ from conventional starch finishes in that they are permanent, i. e., are resistant to washing and dry cleaning. When wet the fabrics treated in this manner are very limp and surprisingly easy to iron and press but when dried become stiff but distensible.

Acid anhydrides that may be utilized in this special application include, among others, succinic anhydride, alkyl and alkenyl-substituted succinic anhydrides, chlorendic anhydride, phthalic anhydride, adipic anhydride, cyclohexene-1,2-dicarboxylic acid anhydride, and mixtures thereof. Particularly preferred are the aromatic polycarboxylic acid anhydrides, aliphatic and cycloaliphatic dicarboxylic acid anhydrides and their halogenated derivatives.

The amount of the curing agent employed will vary depending upon the type of curing agent selected. In general, the amount of the curing agent will vary from about 0.5% to 30% by weight of the polyepoxide. The acids, amines, and $BF_3$ complexes are preferably employed in amounts varying from about 0.5% to 20% and the metal salts are preferably employed in amounts varying from about 1% to 15%. The anhydrides are preferably employed in at least stoichiometric amounts, i. e., sufficient amount to furnish one anhydride group for every epoxy group, and more preferably stoichiometric ratios varying from 1:1 to 1:1.5.

As indicated, the emulsions of the invention in combination with the above-noted curing agents are particularly useful in the treatment of textile fabrics.

The emulsions may be applied to the fabric in a variety of different methods. If it is desired to apply the solution only to one surface of the material, as, for example, when it is desired to treat the back only of a fabric having a face of artificial or natural silk and a cotton back, the application may be effected by spraying or by means of rollers, or the compositions may be spread upon the surface by means of a doctor blade. When, however, it is desired to coat both surfaces of the material, or if the material is to be thoroughly impregnated with it, the fabrics may be simply dipped in the solution or run through conventional-type padding rollers. The solutions may also be applied locally to the material, for example, by means of printing rollers or by stencilling.

The amount of the polyepoxide to be deposited on the fabric will depend upon the intended use of the finished product. If the material is to be used for the preparation of soft goods, such as dresses, shirts, and the like, the amount of polyepoxide deposited will generally vary from 3% to 20% by weight of the fabric. For other materials, such as shoe fabrics, bucrum, and the like, still higher amounts of the polyepoxide, such as of the order of 25% to 50% by weight may be deposited.

If the desired amount of the polyepoxide deposited in the fabric is not obtained in one application, the solution may be applied again or as many times as desired in order to bring the amount of the polyepoxide up to the desired level.

After the desired amount of emulsion has been applied to the fabric, the treated fabric is preferably dried for a short period to remove some or all of the dispersing liquid, such as water. This is generally accomplished by exposing the wet sheets to hot gas either slack or framed to dimension at temperatures ranging up to 120° C. The period of drying will depend largely on the amount of pick-up permitted during the application of the solution, and the concentration of the polyepoxide. In most instances, drying periods of from 1 to 30 minutes should be sufficient.

The dried fabric is then exposed to relatively high temperatures to accelerate the cure of the polyepoxides. Temperatures used for this purpose generally range from 100° C. to 200° C., and more preferably from 130° C. to 190° C. At these preferred temperature ranges the cure can generally be accomplished in from 1 to 10 minutes. Exposures of less than 3 minutes, e. g., 1 minute, may probably be used in continuous, commercial processing.

Any textile fabric, colored or white, may be treated with the aqueous emulsions of the invention as described above. Such materials include the natural or artificial textile materials, such as cotton, linen, natural silk and artificial silk, such as the artificial silk obtained from cellulose acetate or other organic esters or ethers of cellulose and the regenerated cellulosic type of artificial silk obtained by the viscose, cuprammonium or nitrocellulose process, jute, hemp, rayon, animal fibers, such as wool, hair, mohair, and the like, and mixtures thereof. Also included in the group are the synthetic fibers including the fibers from polyesters, such as for example, the ethylene glycol-terephthalic acid polyesters (Dacron), the acrylic polyvinyls, such as for example the acrylonitrile polymers (Orlon), the polyethylenes, polyurethans (Perluran), proteins (Caslen), alginic (alginate rayon), non-acrylic polyvinyls, as vinyl chloride and vinylidene polymers (Vinyon), mineral fibers (Fiberglas), polyamides, such as the aliphatic dicarboxylic acid-polyamide reaction products (nylon), polyvinyl alcohol and the like. While the above process has been described in relation to the treatment of woven fabrics, it should be understood that it can also be applied to other materials, such as knitted or netted fabrics.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the preparation of an emulsion of polyether A described above using a polyethylene glycol ether of a hexiton ester as the emulsifying agent and polyvinyl alcohol as the binding colloid.

50 parts of polyether A and 10 parts of a polyethylene glycol ether of sorbitan monopalmitate were mixed together at 100° C. 50 parts of 5% aqueous solution of polyvinyl alcohol (77% hydrolyzed polyvinyl acetate) was slowly added thereto with stirring. Warm water was slowly added until the emulsion inverted and then additional water was added to bring the total amount of solution to 500. The resulting product was a white creamy emulsion which had excellent stability. The emulsion was allowed to stand for several months and at that time showed no deterioration. The resulting emulsion could easily be applied by spraying or dipping to paper and textile.

About .75 part of zinc fluoborate was stirred into a portion of the above emulsion containing 10 parts of the polyether A and the mixture was padded on rayon cloth by means of a Butterworth-3-Roll laboratory padder. The impregnated cloth was removed and dried at 100° C. and cured for 5.5 minutes at 160° C. The resulting cloth showed improved resistance to shrinkage.

*Example II*

This example illustrates the preparation of an emulsion of polyether A using a partial fatty acid ester of a hexitan as the emulsifying agent and polyvinyl alcohol as the binding colloid.

50 parts of polyether A and 7.5 parts of sorbitan monostearate (Span 60) were mixed together at 100° C. 50 parts of 5% aqueous solution of polyvinyl alcohol (47% partially hydrolyzed polyvinyl acetate) was slowly added thereto with stirring. Warm water was added slowly until the emulsion inverted and then water was added to bring the total amount of solution to 500. The resulting product was a white creamy emulsion which had excellent stability. The emulsion could easily be applied by spraying or dipping to paper and textile fabrics and cured thereon by subsequent treatment with acids and amines.

The above emulsion containing 5 parts (per 100 parts of polyether A) urea-formaldehyde resin was applied to steel panels and baked at 160° C. The resulting films were hard and mar-resistant.

*Example III*

This example illustrates the preparation of an emulsion of polyether A using a polyethylene glycol monostearate as the emulsifying agent and methylcellulose as the binding colloid.

50 parts of polyether A and 15 parts of an alkyl phenyl polyethylene glycol ether (Tergitol NP-27) were mixed together at 100° C. 20 parts of a 5% aqueous solution of polyvinyl alcohol (85% partially hydrolyzed polyvinyl acetate) was slowly added thereto with stirring. Warm water was slowly added until the emulsion inverted and then additional water added to bring the total amount of solution to 500. The resulting product was a white creamy emulsion which had excellent stability.

About .75 part of zinc fluoborate was stirred into a portion of the above emulsion containing 10 parts of the polyether A and this mixture padded on rayon cloth by means of a Butterworth-3-Roll laboratory padder. The impregnated cloth was removed and dried at 100° C. and cured for 5 minutes at 160° C. The resulting cloth showed improved resistance to shrinkage.

The above emulsion containing zinc fluoborate may also be used to treat synthetic fiber, such as Dacron, to improve the resistance to "pilling."

*Example IV*

This example illustrates the preparation of an emulsion of polyether B described above using a polyethylene glycol ether of a hexitan ester as the emulsifying agent and polyvinyl alcohol as the binding colloid.

50 parts of polyether A and 7.5 parts of a polyethylene glycol ether of sorbitan monopalmitate were mixed together at 100° C. 40 parts of a 5% aqueous solution of polyvinyl alcohol (77% partially hydrolyzed polyvinyl acetate) was slowly added thereto with stirring. Warm water was slowly added until the emulsion inverted and then additional water was added to bring the total amount of solution to 500. The resulting product was a white creamy emulsion which had excellent stability. The emulsion was allowed to stand over several months and at that time showed no deterioration. The resulting emulsion could be easily applied to paper and textile fabrics and cured thereon by spraying with acid and amine solutions and heating to 100° C.

Related stable emulsions were obtained by replacing the polyether B in the above process with equal amounts by weight of polyether C, polyether D and polyether E. In the case of the solid polyethers it was necessary to melt the polyether with the emulsifying agent before addition of the polyvinyl alcohol.

A related stable emulsion was also obtained by replacing the polyether A in the above process with a mixture of 25 parts of polyether A and 25 parts of a glycidyl polyether of glycerol.

*Example V*

This example illustrates the preparation of a stable emulsion of polyallyl glycidyl ether (polyether G as described above).

20 parts of polyallyl glycidyl ether was mixed with 2 parts of a polyethylene glycol monostearate and the mixture heated to 100° C. To this mixture was added 20 parts of warm 5% aqueous polyvinyl alcohol (80% partially hydrolyzed polyvinyl butyrate) solution with stirring. Warm water was then added slowly until the emulsion inverted and then water added to bring the total solution up to 20% resin solution. This solution was a white creamy emulsion which showed excellent stability.

About .75 part of zinc fluoborate was added to the above emulsion and this mixture padded on rayon cloth by means of a Butterworth-3-Roll laboratory padder. The impregnated cloth was removed and dried at 100° C. and cured for 5 minutes at 160° C. The resulting cloth showed improved resistance to shrinkage.

The above emulsion containing zinc fluoborate was also spread on glass panels and cured at 160° C. The resulting films were very hard and mar resistant.

*Example VI*

This example illustrates the preparation of a stable emulsion of epoxidized glycerol trioleate.

20 parts of epoxidized glycerol trioleate was mixed with 3 parts of polyethylene glycol monostearate and the mixture heated to 100° C. To this solution was added 30 parts of 5% polyvinyl alcohol solution slowly with stirring. Warm water as added to the emulsion inverted and then additional water added to bring the solution to a 20% resin solution.

About 1.25 parts of zinc fluoborate was stirred into a portion of the above emulsion containing 10 parts of the epoxidized triglyceride and this mixture padded on rayon cloth as shown above. The impregnated cloth was removed and dried at 100° C. and cured for 5 minutes at 160° C. The resulting cloth showed improved resistance to shrinkage.

*Example VII*

This example illustrates the preparation of a stable emulsion of the glycidyl ether of the Cardanol-phenol condensate (polyether F described above).

20 parts of polyether F was mixed with 2 parts of polyethylene glycol ether of sorbitan monopalmitate and the mixture heated to 100° C. To this mixture was added 20 parts of warm 5% polyvinyl alcohol solution with stirring. Warm water was then added to bring the solution up to a 20% resin solution. The resulting product was a white creamy emulsion which had excellent stability. The emulsion could be easily applied by spraying or dipping to paper and textile fabrics and cured thereon by subsequent treatment with acids and amines.

Related emulsions are obtained by replacing the polyvinyl alcohol in the above process with equal amounts of carboxymethyl cellulose.

*Example VIII*

This example illustrates the preparation of an emulsion of polyether A containing an anhydride curing agent and its use in the treatment of cotton goods to give a permanent starch finish.

8.0 parts of polyether A and 10.8 parts of chlorendic anhydride were melted together and .8 part of a polyethylene glycol ether of sorbitan monopalmitate added. 8.0 parts of 5% aqueous polyvinyl alcohol (77% partially hydrolyzed polyvinyl acetate) was added slowly with stirring. Water was then added to produce a 20% resin solution. This mixture was a white creamy stable emulsion.

Cotton cloth was then padded with the above solution by means of the Butterworth-3-Roll laboratory padder. The impregnated cloth was removed and dried at 100° C. and cured 5.5 minutes at 160° C. The resulting cloth had a stiff finish but was still flexible and distensible. The cloth was washed several times with soap and in each case after ironing and cooling the cloth still retained the stiff finish. When damp, the cloth was much easier to iron than cloth treated with conventional starching agents.

*Example IX*

This example illustrates preparation of an aqueous emulsion of polyether E containing an anhydride curing agent and its use in treating cotton to give a permanent starch finish.

10 parts of polyallyl glycidyl ether was combined with 10 parts of hexahydrophthalic anhydride, 4 parts of benzene, 0.7 part of stearyl dimethyl amine and 1 part of a polyethylene glycol ester of sorbitan monopalmitate and the mixture heated to 100° C. with stirring. 20 parts of a 5% aqueous polyvinyl alcohol (80% part. hydrolyzed polyvinyl propionate) solution was then added slowly with stirring. Water was then added to bring the solution to a 15% resin solution.

The above emulsion was then padded on cotton cloth as described above. The treated cloth was cured 12 minutes at 160° C. The treated cloth had a stiff finish but was still flexible and distensible. The cloth retained the stiff finish even after washing and dry cleaning.

*Example X*

This example illustrates preparation of an aqueous emulsion of epoxidized glycerol trioleate containing an anhydride curing agent and its use in treating cotton cloth to give a permanent starch finish.

9.0 parts of epoxidized triglyceride was combined with 6.2 parts of chlorendic anhydride, 2.5 parts of hexahydrophthalic anhydride, 0.9 part of polyethylene glycol monostearate and 0.6 part of stearyl dimethyl amine and the mixture heated to 100° C. 9.0 parts of 5% aqueous polyvinyl alcohol (77% part. hydrolyzed polyvinyl acetate) was then added slowly with stirring and warm water added to bring up to 15% solution of resin.

The above solution was then padded on cotton cloth as described above. The treated cloth was cured 12 minutes at 160° C. The treated cloth had a stiff finish but was still flexible and distensible. The stiff finish was still retained even after several washings. It was very limp but on ironing again was very stiff.

Cotton cloth having similar permanent starch finish is obtained by repeating the above with the exception that the chlorendic and hexahydrophthalic anhydride is replaced by equal amounts of octadecylsuccinic anhydride and citraconic anhydride.

*Example XI*

This example illustrates the preparation of an aqueous emulsion of polyether H containing an anhydride curing agent and its use in treating cotton cloth to give a permanent starch finish.

10 parts of polyether H prepared as above is combined with 15 parts of hexahydrophthalic anhydride, 4 parts of benzene, 0.7 part of stearyl dimethyl amine and 1 part of a polyethylene glycol ester of sorbitan monopalmitate and the mixture heated to 100° C. with stirring. 25 parts of 5% aqueous polyvinyl alcohol (77% partially hydrolyzed polyvinyl acetate) is slowly added with stirring. Water is then added to bring the solution to a 15% resin solution.

The above emulsion is then padded on cotton cloth as described above. The treated cloth is cured 12 minutes at 160° C. The resulting product has a stiff finish but is still flexible and distensible. The cloth retains the stiff finish even after washing and dry cleaning.

*Example XII*

This example illustrates the use of the emulsion prepared in Example I containing zinc fluoborate in the treatment of nylon.

The emulsion prepared as in Example I was placed in a Butterworth-3-Roll laboratory padder and white nylon fabric padded therewith to a 100% pick-up. The treated cloth was then cured at 160° C. for 5.5 minutes. The treated cloth had a soft feel, good hand and displayed stitch locking and anti-snag properties.

This application is a continuation-in-part of my application Serial No. 369,503, filed July 21, 1953, and now abandoned.

I claim as my invention:

1. An oil-in-water emulsion comprising as the dispersed phase a polyepoxide and an aqueous dispersing phase containing an acid and alkali stable non-ionic emulsifying agent and a water-dispersible binding colloid, said emulsion being free of solvents and containing an epoxy curing agent.

2. An emulsion as defined in claim 1 wherein the polyepoxide is a glycidyl polyether of a polyhydric phenol having the epoxy groups in terminal positions and having an epoxy equivalency greater than 1.0 and a molecular weight between 300 and 1500.

3. An emulsion as defined in claim 1 wherein the polyepoxide is a glycidyl polyether of a polyhydric alcohol.

4. An emulsion as defined in claim 1 wherein the polyepoxide is a polymer of an epoxy-containing ethylenically unsaturated monomer formed by addition polymerization through the ethylenic group.

5. An emulsion as defined in claim 1 wherein the polyepoxide is a glycidyl ether of a novalac resin obtained by condensing an aldehyde with a polyhydric phenol.

6. An emulsion as defined in claim 1 wherein the polyepoxide has two hydroxyaryl groups separated by an aliphatic chain of at least six carbon atoms in the chain and with the aliphatic chain being attached by carbon-to-carbon bonding to a nuclear carbon atom of the hydroxyaryl groups.

7. An emulsion as defined in claim 1 containing an epoxy curing agent of the group consisting of organic acids and anhydrides, inorganic acids and their salts, amines and $BF_3$-amine and $BF_3$-phenol addition compounds.

8. An emulsion as defined in claim 1 wherein the emulsifying agent is an ester of a polyhydric alcohol and fatty acids containing from 12 to 18 carbon atoms.

9. An emulsion as defined in claim 1 wherein the emulsifying agent is a polyoxyalkylene ether of an ester of polyhydric alcohol and fatty acids containing from 12 to 18 carbon atoms.

10. An emulsion as defined in claim 1 wherein the water-dispersible binding colloid is a partially hydrolyzed polyvinyl acetate.

11. An oil-in-water emulsion consisting of (1) as the dispersed phase a water-insoluble polyepoxide having an epoxy equivalency greater than 1.0 and a molecular weight above 250 and (2) an aqueous dispersing phase containing an acid and alkali stable non-ionic emulsifying agent of the group consisting of esters of polyhydric alcohols and fatty acids containing up to 18 carbon atoms, and polyoxyalkylene ethers of the esters of polyhydric alcohols and fatty acids containing up to 18 carbon atoms and a water-dispersing binding colloid, said emulsion also containing an epoxy-curing agent and being free of solvents.

12. An oil-in-water emulsion as defined in claim 11 wherein the epoxy-curing agent is an acid-acting compound.

13. An oil-in-water emulsion as defined in claim 11 wherein the water-dispersing binding colloid is a polyvinyl alcohol.

14. An oil-in-water emulsion as defined in claim 11 wherein the polyepoxide is poly(allyl glycidyl ether).

15. An oil-in-water emulsion as defined in claim 11 wherein the polyepoxide is a glycidyl polyether of 2,2-bis(4-hydroxyphenyl) propane.

16. An oil-in-water emulsion as in claim 11 wherein the epoxy-curing agent is an acid anhydride.

17. A method for preparing permanent starch finish to textile fabrics which comprises impregnating the fabric with an oil-in-water emulsion comprising as the dispersed phase a relatively water-insoluble polyepoxide and an aqueous dispersing phase containing an acid and alkali stable non-ionic emulsifying agent and a water-dispersing binding colloid, said emulsion being free of organic solvents and containing an acid anhydride epoxy-curing agent, and then heating the treated fabric to an elevated temperature to effect cure of the polyepoxide.

18. A method as in claim 17 wherein the anhydride is chlorendic anhydride.

19. A method as in claim 17 wherein the fabric is a cellulosic fabric.

20. A method as in claim 17 wherein the polyepoxide is a glycidyl polyether of a polyhydric phenol having an epoxy equivalency greater than 1.0 and a molecular weight between 300 and 1500.

References Cited in the file of this patent

UNITED STATES PATENTS

| | | |
|---|---|---|
| 2,637,705 | Auer | May 5, 1953 |
| 2,754,279 | Hall | July 10, 1956 |